May 10, 1966   J. O. JOHNSON, JR   3,250,118
FLUID ANALYZING APPARATUS
Filed June 14, 1963   3 Sheets-Sheet 1

INVENTOR.
JUSTIN O. JOHNSON, JR.
BY *Arthur H. Swanson*
ATTORNEY.

INVENTOR.
JUSTIN O. JOHNSON, JR.
ATTORNEY.

May 10, 1966  J. O. JOHNSON, JR  3,250,118
FLUID ANALYZING APPARATUS
Filed June 14, 1963  3 Sheets-Sheet 3

INVENTOR.
JUSTIN O. JOHNSON, JR.
BY
ATTORNEY.

3,250,118
FLUID ANALYZING APPARATUS
Justin O. Johnson, Jr., Levittown, Pa., assignor to Honeywell Inc., a corporation of Delaware
Filed June 14, 1963, Ser. No. 287,811
7 Claims. (Cl. 73—53)

It is an object of the present invention to disclose a measuring apparatus to continuously analyze a fluid stream, such as a stream of raw river water.

Prior to the present invention, it has been the practice to transmit an individual sample of water to be tested by way of a first individual conduit to a first water sampling tank located in one section of a laboratory where a first measurement of the characteristic of the water is made under a first ambient temperature laboratory condition and to transmit other different individual conduits to other associated water sampling tanks that are located in other different remote locations in the laboratory where other different ambient temperature conditions exist.

With this widely separated sampling tank arrangement, it has been impossible to obtain any true correlation between the measurements being made of a water sample in one of the tanks and the measurement being made of the other different samples of this water that are present in any one of the other tanks.

More specifically, it is another object of the present invention to disclose a single distribution chamber surrounding a fluid inlet passageway of a sampling tank so that samples of fluid such as raw water having essentially the same physical characteristics can simultaneously flow into each one of a cluster of fluid sampling tanks.

In order to determine the time it takes for a stream to rid itself of a polluted condition which is brought about by an animal, fish or vegetable life-killing chemical that has been dumped into a stream, it has become more readily important for our public health bacteriologists to have a better, more accurate way of measuring certain selected characteristics possessed by a sample of raw water which is drawn from the stream without introducing different ambient temperature errors and other errors due to poor sampling techniques into each of these measurements.

It is desirable that the parts forming the sampling chamber be constructed so that they can be easily separated, cleaned in a more thorough, rapid fashion than has heretofore been possible so as to remove completely any bacteria and crud adhering thereto and reassembled in the shortest allotted time in order to reduce the measuring shutdown time to a minimum.

It is, therefore, a more specific object of the present invention to disclose a raw water analyzing apparatus whose construction is such that it can be easily separated, rapidly cleaned and reassembled in an abnormally short period of time so that the measuring shutdown time required to accomplish these three functions is minimized.

A better understanding of the present invention may be had from the following detailed description when read in connection with the accompanying drawings, in which.

Figure 1:
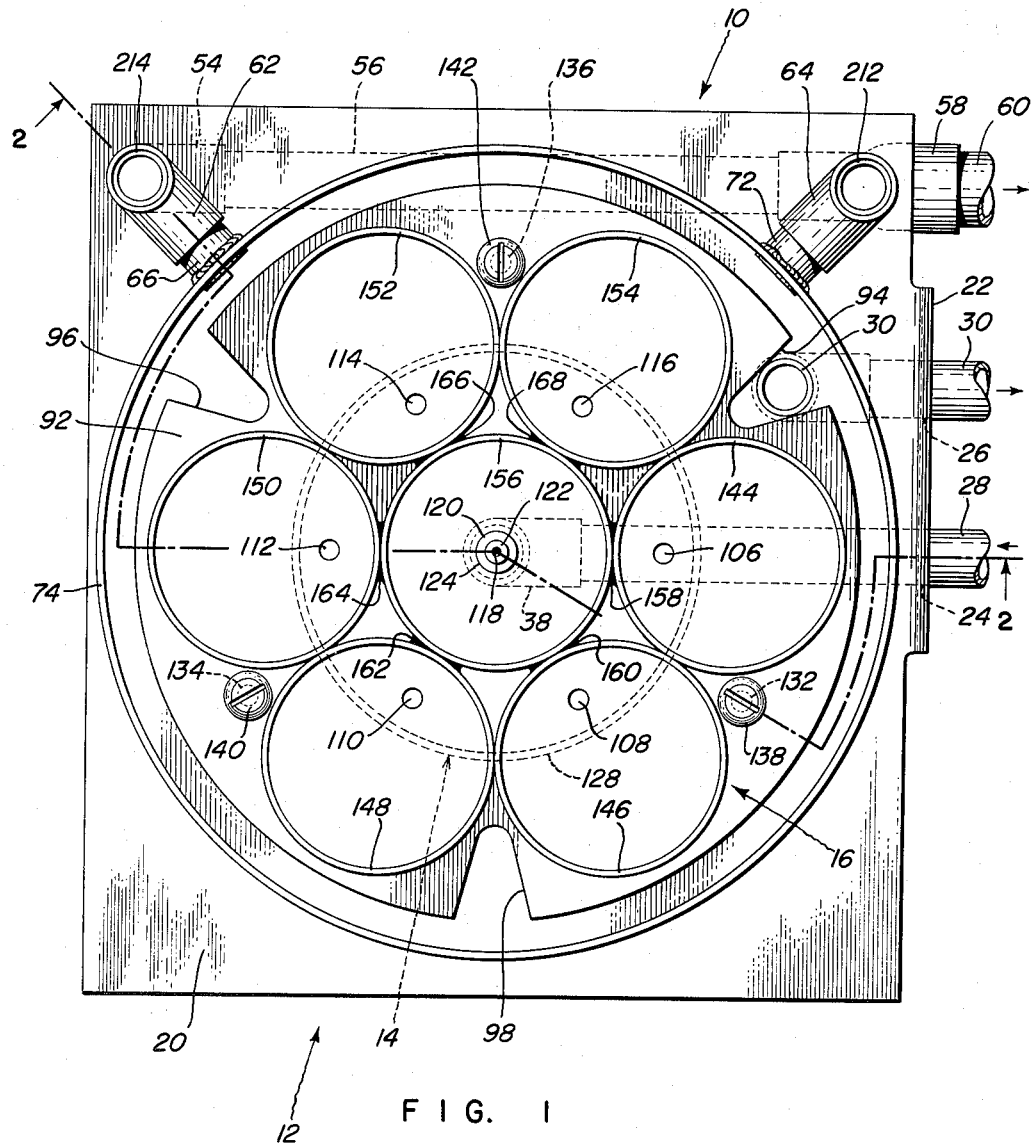
FIG. 1 shows a top plan view of the fluid analyzing apparatus.
Figure 2:
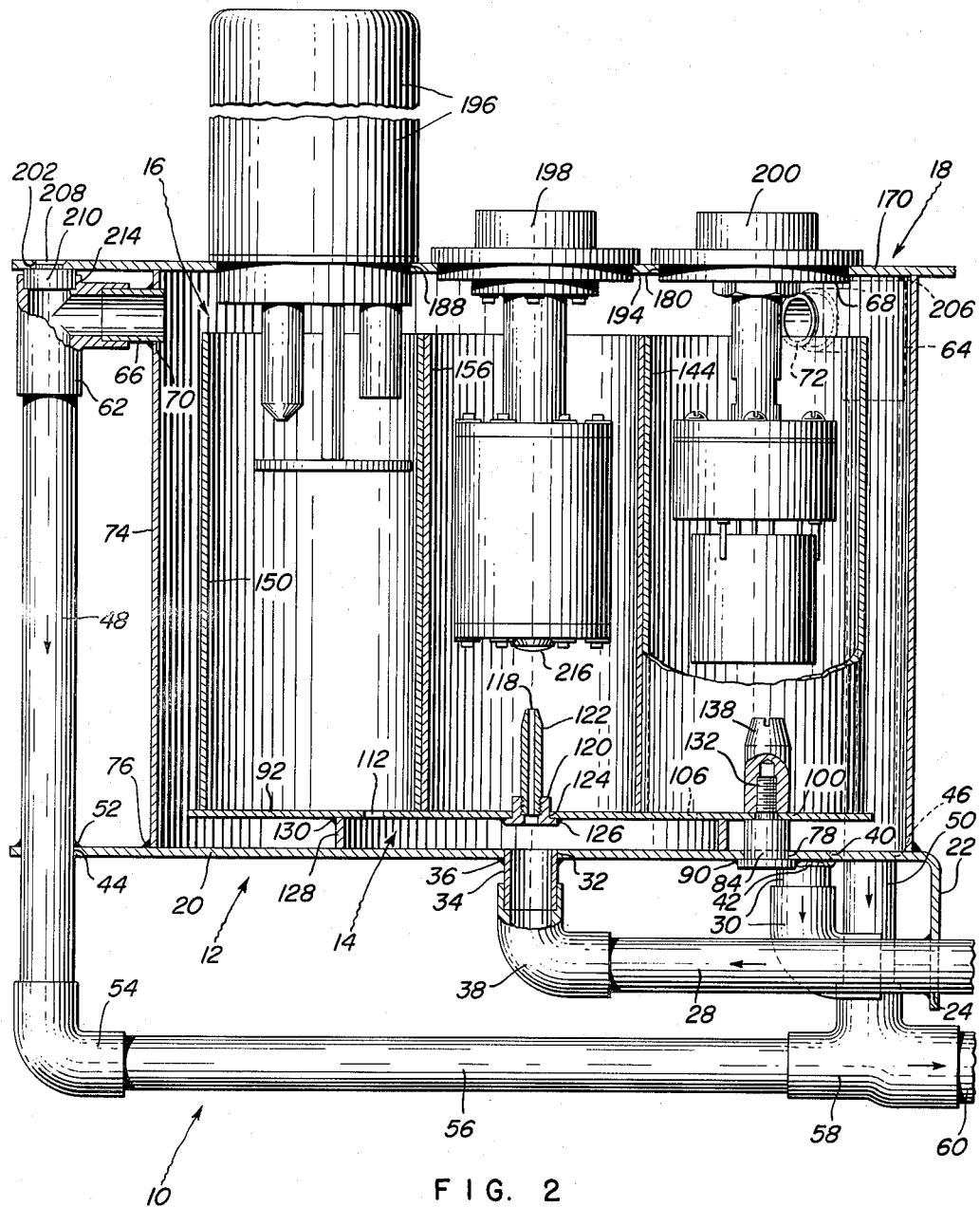
FIG. 2 shows a cross-sectional view of the analyzing apparatus taken along the section line 2—2 of FIG. 1.

The fluid stream analyzing apparatus 10 shown in FIGS. 1 and 2 of the drawing is comprised of a tank assembly 12 having a dismountable fluid distribution chamber structure 14, a tube cluster structure 16 and a tank cover structure 18 associated therewith.

Figure 3:
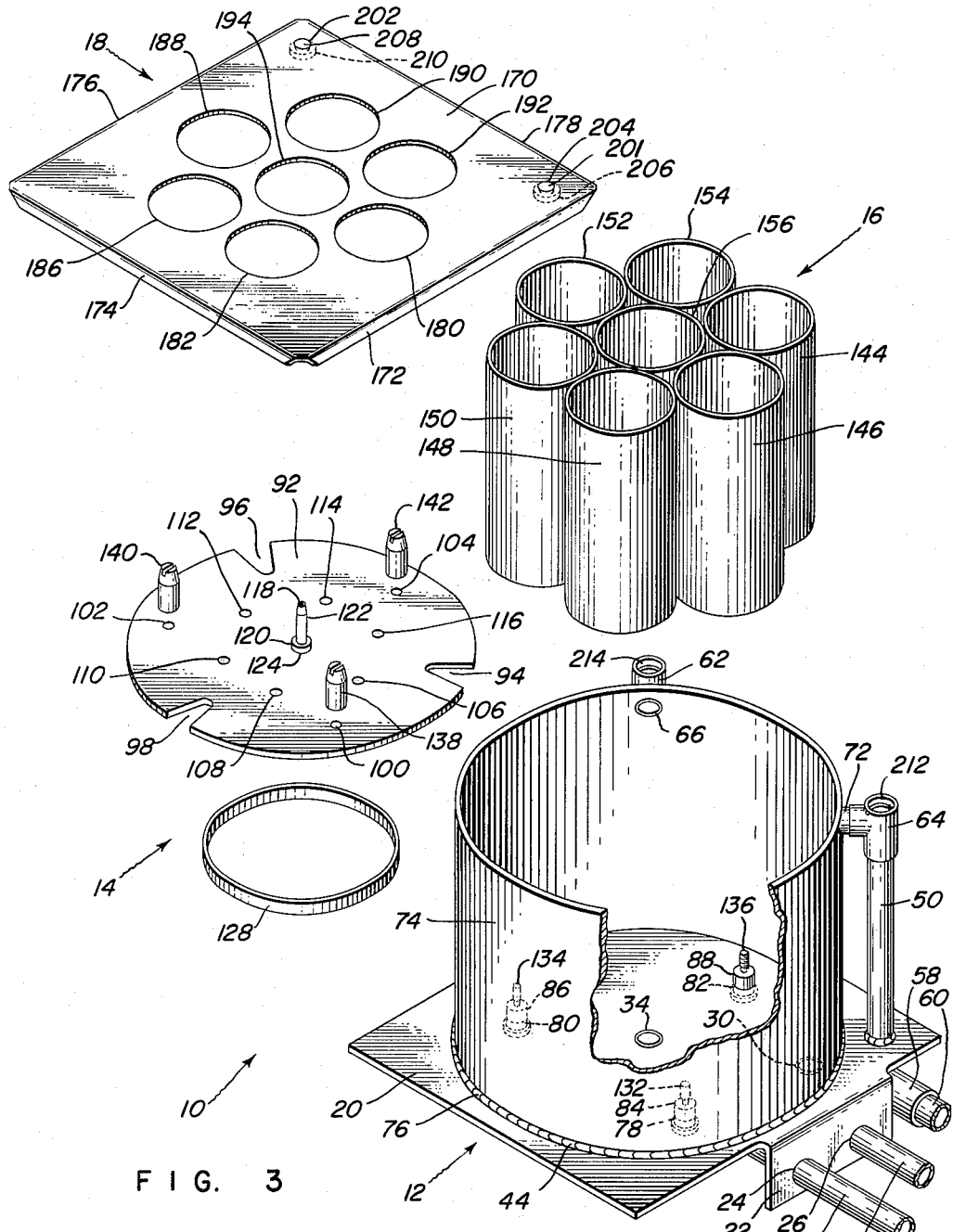
FIG. 3 is an exploded view showing the assembled parts shown in FIG. 1 disassembled.

The tank assembly 12 is best shown in FIG. 3 and is constructed of a stationary base plate 20 having a bent bracket 22 extending therefrom. The bent bracket 22 has two apertured wall portions 24, 26 to which the outer wall of the inlet conduit 28 and the outer wall of the drain conduit 30 are fixedly connected by a suitable welding material.

The base plate 20 of the tank assembly 12 also has an apertured wall portion 32. The outer wall of a cylindrical sleeve 34 is fixedly connected to the apertured wall portion 32 by means of a fluid-tight soldered joint 36. The lower end of the sleeve 34 is connected in fluid-tight engagement with one leg of an elbow 38. The other leg of the elbow 38 is shown in fluid-tight engagement with the outer left end wall of the previously-mentioned inlet conduit 28.

The base plate 20 of the tank assembly 12 also has an apertured wall portion 40 into which the upper end of the drain pipe 30 is shown inserted and welded at 42 in a water-tight position. The base plate 20 also has two additional apertures 44, 46 for passage of the overflow tubes 48, 50 therethrough. The outer surface of each of the overflow tubes 48, 50 are fixedly connected to the base plate 20 by suitable welding material 52 in the manner shown for tube 48 in FIG. 2 of the drawing.

The lower end of the overflow tube 48 is connected by way of an elbow connection 54 and conduit 56 to the left leg of the flow reducing T 58. The lower end of the overflow tube 50 is connected directly to the top leg of the T 58. The remaining right leg of the T 58 is connected by way of a suitable open pipe connection 60 to a downstream portion of a stream from that point in the stream from which the fluid flowing into the right end of the inlet conduit 28 is being drawn.

The upper ends of the overflow tubes 48, 50 are shown connected by way of associated T connections 62, 64 and associated sleeve connections 66, 68 to apertured wall portions 70, 72 formed in spaced-apart portions of the upper part of the side wall 74 of the tank assembly 12.

The lower end of the side wall 74 is connected in a fluid-tight manner as shown at 76 to the previously-referred-to base plate 20. The base plate 20 of the tank assembly 12 is provided with three apertured wall portions 78, 80, 82. Each of these apertured wall portions 78, 80, 82 is shown having an associated pin 84, 86 or 88 passing therethrough. The head of each of these pins is fixedly held in fluid-tight engagement with the base plate 20 by means of a suitable solder material, such as is best shown at 90 in FIG. 2.

The dismountable fluid distribution chamber 14 is shown located within the tank assembly 12 in FIG. 2. This chamber is formed by a distribution plate 92 containing flow-through slotted wall portions 94, 96, 98 and three equally-spaced-apart apertures 100, 102, 104. This distribution plate 92 also is provided with six circumferentially-spaced-apart open fluid inlet ports 106, 108, 110, 112, 114, 116 at a centrally-located inlet port 118 that is formed by an embossed sleeve 120 and nozzle 122. The embossed sleeve 120 is shown passing through the aperture 124 formed in the distribution plate 92 and as being welded in fluid-tight engagement by means of a suitable solder 126 to this plate 92.

The bottom of the distribution plate 92 has a ring-shaped plate 128 fixedly connected to it along its entire circumferential surface by means of a fluid-tight joint made of a suitable solder material 130, as is best shown in FIG. 2 of the drawing.

When assembling the distribution plate and the ring plate 128, that is integral therewith in the lower part of the tank assembly 12 formed by its cylindrical side wall 74 and the base plate 20, the centers of the apertures 100, 102 and 104 are aligned with and inserted over the upper threaded end portions 132, 134, 136 of the pins 84, 86, and 88 into the position shown in FIG. 2. When the distribution plate 92 and the ring plate 128, integral therewith, are placed in the aforementioned position it can be seen that the lowermost surface of the ring-shaped plate 128 will be in contact with the upper inside surface of the stationary base plate 20 of the tank assembly 12 to form the previously-mentioned fluid distribution chamber 14.

Guide nuts 138, 140, 142 are then threadedly mounted in a tight position thereon as shown in FIGS. 1 and 2 to retain the ring plate 128 of the distribution plate 92 in substantially fluid-tight engagement with the top inside surface of the base plate 20 with which it is in contact.

The tube cluster 16 is shown in FIG. 1 as being comprised of seven tubes 144, 146, 148, 150, 152, 154, 156 that are fixedly connected along outer wall surfaces thereof to one another by means of the solder connections shown at 158, 160, 162, 164, 166, and 168.

After the cluster of tubes 16 is inserted down through the space within the side wall 74 of the tank assembly 12 and into position, shown in FIG. 1, these tanks will be retained by means of the guide nuts 138, 140, 142 in a non-rotatable position on the distribution plate 92. The guide nuts 138, 140, 142 are thus shown as serving two useful purposes; namely, to retain the dismountable fluid distribution chamber in a fluid-tight condition, and to prevent the dismountable tank cluster from moving clockwise or counter-clockwise on the distribution plate 92.

As is best shown in FIGS. 2 and 3, the tank cover structure 18 is constructed of a single square-shaped plate 170 with its four corners notched out so as to form four downwardly protruding side parts 172, 174, 176, and 178. The plate 170 is also shown as having wall portions forming seven apertures 180, 182, 186, 188, 190, 192, and 194. As is best shown in FIG. 2, each of these apertured wall portions 180–194 is aligned with one of the tubes 144–158 of the tube cluster 16, but is shown slightly smaller in diameter than the diameter of the tubes.

The aforementioned structural arrangement of the covered structure 18 and the tube cluster 16 facilitates the insertion of a portable pH sensing probe unit 196 into the tube 150, a portable dissolved oxygen sensing probe unit 198 into the center tube 156 and a portable conductivity cell 200 into the tube 44, shown in FIG. 2. Other different portable probe units can be inserted in each of the remaining tubes if it is desired to measure additional characteristics of a fluid such as raw water. Although not shown in the drawing, it might for example be desirable to employ a probe in the form of a thermocouple to sense the temperature of the water that is being pumped by means of a pump, not shown, from various levels below the top surface of a river into the inlet pipe 28.

Another commercially-available probe, that could be inserted in lieu of the probes shown in the drawing or in one of the remaining tubes, could advantageously be a probe for measuring the turbidity of the raw water.

The tank cover plate 170 is provided with two spaced-apart apertured wall portions 201, 202. A centering pin 204 is shown passing through the apertured wall portion 200 and having a cylindrically-shaped portion 206 extending in a downward direction from the bottom surface of the plate 170. A similar centering pin 208 passes through the apertured wall portion 202 that has a cylindrically-shaped portion 210 extending in a downward direction from the bottom of the plate 170.

The tank cover plate 170 is placed in its readily-removable position by simultaneously lowering the cylinder-shaped portion 206 of the pin 204 into the upper open end 212 of the T 64 and the cylindrical-shaped portion 210 of the pin 208 into the upper open end 214 of the T 62.

It is preferred to make the various parts of the fluid stream analyzing apparatus of a copper material or any other similar material that has the desirable characteristics of keeping marine growth such as algae at a minimum on the parts over which the raw water passes.

When it is desired to employ the apparatus disclosed herein to take various types of physical measurements of a fluid stream, such as a stream of raw river water, it is first necessary to (a) assemble the fluid distribution plate 92 and ring part 128 and the tube cluster 16 associated therewith within the confines of the cylindrical side wall 74; (b) assemble the tank cover structure 18 with the desired probe sensing units mounted therein on the top of a side wall as previously described, and (c) open the necessary valves, not shown, to allow a sample of the fluid being pumped from a level in the stream to be measured to flow through the inlet conduit 28, elbow 38, sleeve 34 into the fluid distribution chamber 14.

This distribution chamber 14 is constructed to allow samples of the raw water that have essentially the same physical characteristics to be simultaneously fed by way of the spaced-apart apertured wall portions 106, 108, 110, 112, 114, 116 into each of the tubes 144, 146, 148, 150, 152, 154 and 156 which make up the tube cluster 16. A nozzle, such as the nozzle 122, can be employed to continuously direct a spray of the inflowing water to be measured against a dissolved oxygen sensing portion 216 of the probe 198 in order to keep the probe clean. This probe-cleaning action will thus prevent the building up of marine growth such as algae on the probe, and this will make it possible to take an accurate reading of the dissolved oxygen content of the water for a continuous, long measuring period.

When the level of the inflowing raw water reaches the top of each of the tanks 144–156, it will flow over the top of the tube clusters 16 into the space between the external wall of the tube cluster 16 and the retainer plate ring 128 and the inside surface of the side wall 150 and base 20 of the tank assembly 12.

When the fluid reaches the lowest surface of the tank 74, 20 it will flow out of the tank by way of the drain conduit 30. Since the rate of flow of the fluid flowing over the top of the tube cluster 16 is greater than the rate at which the fluid is drained from the tank through conduit 30, the level of the water between the external surface of the tubes 16 and the internal side wall of the tank 74 will rise. The level of this water will continue to rise until it reaches the level of the sleeves 66, 68 of the overflow tubes 62, 48, 54, 56, 64 and 50, which tubes are jointly interconnected by way of a T 58 to a common drain 60.

The rate of flow of the inflowing fluid is such that a continuous overflow of the fluid will take place in the aforementioned manner through the sleeves 66–68.

Since the structural arrangement of the tube cluster and tank is such as to permit a column of flowing water to be continuously applied to the entire outer surface of each of the tubes forming the tube cluster 16, this structural arrangement of the parts described herein will maintain the water under measurement in each tube at the same temperature as the water retained therein. This arrangement thus enables all of the different characteristics of the water under measurement to be made at the same temperature so that a more accurate correlation between these measurements can be achieved.

Rapid removal for cleaning of the parts of the aforementioned fluid analyzing apparatus is accomplished by: lifting, by hand, the cover structure 18 in a vertical direction to remove it from the top of the tank; lifting the tube cluster in a vertical direction through the open end of the tank, disengaging the guide nuts and removing the distribution plate.

After the parts are removed in this fashion, it can be seen that individual, thorough, rapid cleaning of all the surfaces in the tank 20, 74 and part 92, 128 of the distribution chamber 14 can be accomplished by means of an ordinary bristle brush. It can also be seen that since the removed tubes forming the tube cluster 16 are opened at both ends, a more rapid complete cleaning of the lowermost inner and outer wall portions of the tubes by means of an ordinary scrub brush is possible with this tube-tank construction than has heretofore been possible with other presently-available tube-tank structures which permanently fix the tubes to the bottom of the sampling tank.

It can also be seen that the non-rotatable, readily-removable cover structure 18 can also be more rapidly and completely cleaned and replaced than has heretofore been possible with other presently-available covers that are permanently fixed to the top portion of the side walls 74 of the tank assembly.

From the aforementioned description, it can be seen that a fluid sampling tank has been disclosed which contains a unique, rapidly-dismountable fluid distribution chamber and a rapidly-dismountable tube cluster that are supported in a non-rotatable manner within the tank. This tank, chamber and tube cluster construction is provided with an interconnecting inlet and outlet passageway therebetween to allow a flowing stream of fluid under measurement, having essentially the same physical characteristics at any one instant of measuring time, to be simultaneously passed into, through and out of each of the sampling tubes into the space formed between the side wall of the tank and tubes and thereby maintain the flowing fluid within these tubes at the same ambient temperature.

It can also be seen that the sampling tank is provided with a readily dismountable cover having apertured wall portions therein for removably supporting different probe units that are employed to sense a different characteristic of a fluid flowing through each tube. The aforementioned parts within the sampling tank are constructed so that they are void of hard-to-clean crevasses and, therefore, can be more thoroughly and rapidly cleaned and reassembled in the tank than is possible with other presently-available tank constructions whenever a periodic cleaning of these parts is deemed necessary.

What is claimed is:

1. An apparatus for facilitating the continuous measurement of a quality of a fluid stream, comprising a tank having a vertical side wall and a base portion formed integral therewith, a distribution plate positioned away from an inner bottom surface of the tank and forming a top wall of a distribution chamber, another wall forming a side of said chamber, one end of the last-mentioned wall being fixedly connected to the lower surface of the distribution plate and another opposite end of the wall being in physical surface-to-surface engagement with an inner bottom surface of the tank that is employed to form a bottom wall of the distribution chamber, a first inlet port operably connected to the central portion of the bottom wall of the distribution chamber, an integral cluster of tubes, one end of each of the tube clusters being in surface-to-surface contact with a top surface portion of the distribution plate that is immediately above the distribution chamber, separate inlet ports in the distribution plate forming passageways between the distribution chamber and separate sampling chambers formed by the inner wall of each of the tubes, connecting means to simultaneously retain the integral tube cluster in a removable, but non-rotatable, position on the distribution plate and screw means associated with the connecting means to retain the unattached end of the side wall of the distribution chamber in fluid-tight engagement with the base portion of the tank, the other end of the tubes being of a shorter length than the height of the tank and being positioned inwardly from the side wall of the tank, a fluid outlet passageway in the base of the tank that is exterior to the portion of the base plate forming the bottom of the distribution chamber, and interconnected fluid overflow passageways formed in the top vertical side wall portion of the tank.

2. A fluid analyzing apparatus comprising a tank, at least one tube positioned within, and in spaced relation with a wall forming the bottom and side portions of the tank, a separate dismountable fluid distribution chamber formed within and adjacent the base of the tank, fluid passageways adapted to pass a sample of fluid to be analyzed through a base portion of the tank through the dismountable fluid distribution chamber into the base portion of each one of the tubes and thence through an upper open wall portion of each tube into the tank and out through spaced-apart overflow drains positioned in the upper wall portions of the tank and simultaneously through a drain positioned in the base portion that is external to the distribution chamber, and a responsive means positioned within each of the tubes adapted to measure changes occurring in the physical characteristics of the fluid under analysis that is passed between the lower and upper open wall portion of the tubes.

3. A fluid analyzing apparatus comprising a tank, a unitary tube cluster positioned within and in spaced relation with a wall forming the bottom and side portions of the tank, a separate dismountable fluid distribution chamber formed within and adjacent the base of the tank, fluid passageways adapted to pass a sample of fluid to be analyzed through a base portion of the tank through the dismountable fluid distribution chamber into the base portion of each of the tubes and thence through an upper open wall portion of each tube into the tank and out through spaced-apart drains positioned in the upper wall portions of the tank and simultaneously through a drain positioned in the base portion that is external to the distribution chamber, and a responsive means positioned within each of the tube clusters adapted to measure changes occurring in the physical characteristics of the fluid under analysis that is passed between the lower and upper open wall portion of the tubes.

4. A dismountable apparatus for facilitating the continuous measurement of different physical characteristics of a flowing stream of raw water comprising a dismountable cluster of sampling tubes, an open tank having a side wall surrounding the tubes, a dismountable distribution chamber extending upwardly from a bottom wall portion of the tank that forms one of the walls of the chamber, a first inlet port passing through a bottom wall portion of the tank, an opposite wall of the chamber having additional inlet ports operably connecting the interior of the chamber with the inner bottom portions of each of the tubes of the tube cluster, each of said additional ports being adapted to receive a stream of the raw water to be measured by way of the first inlet port and the chamber, a dismountable cover supported by the top edge of a tank containing spaced apertured wall portions therein, and a plurality of dismountable separate probe units each responsive to a different characteristic of the raw water under measurement supported by the cover and protruding through each of the apertured wall portions formed therein and into each of the tubes.

5. The continuous measuring apparatus, as specified in claim 4, wherein the distribution chamber has a side wall that is fixedly connected at one end in fluid-tight engagement with the said opposite wall of the chamber and wherein its other end is in surface-to-surface contact with the inner bottom wall portion of the tank.

6. The apparatus, as specified in claim 4, wherein the distribution chamber has a side wall that is fixedly connected at one end in fluid-tight engagement with the said opposite wall of the chamber and wherein its other end is in surface-to-surface contact with the inner bottom wall portion of the tank, a plurality of spaced-apart threaded pin connections protruding upwardly from the base of the tank through apertured wall portions formed in a wall portion of the top wall of the distribution chamber that extends beyond the chamber, guide nuts, a threaded connection between each of the guide nuts and the threaded pins to force the other end of the side wall of the chamber into fluid-tight engagement with the inner bottom surfaces of the tank, and each of said threaded pin and nut connections being positioned immediately adjacent different pairs of outer converging tube surfaces to threadedly retain the sampling tubes in a removable non-rotatable position on an outer peripheral portion of the opposite top wall of the dismountable distribution chamber.

7. A sampling tank to analyze the condition of a fluid stream, comprising a tank, a removable fluid distribution chamber positioned within the inner base portion of the tank, a removable unitary cluster of sampling tubes mounted at one end upon the distribution chamber, passageways connecting an inflowing fluid stream to be analyzed in series with the fluid distribution chamber and the lower inner base portion of each of the sampling tubes, a responsive means positioned within each tube to measure changes occurring in a different physical characteristic of the fluid stream that is passed between the lower inner base portion and an upper open wall portion of each tube and wherein each one of a plurality of spaced-apart bolts and separate removable guide nut connections mounted thereon are positioned to contact the outer peripheral surface of different adjacent pairs of the tubes to retain the cluster of sampling tubes in a non-rotatable vertically removable position upon the distribution chamber and the lowermost end of the side wall portions of the chamber in fixed physical contact with an inner base surface of the tank.

References Cited by the Examiner
UNITED STATES PATENTS

| | | | |
|---|---|---|---|
| 2,082,299 | 6/1937 | Nonhebel et al. | 73—53 |
| 2,319,531 | 5/1943 | Brown et al. | 134—166 |
| 2,435,807 | 2/1948 | Udell | 134—170 X |
| 2,660,884 | 12/1953 | Dean | 73—53 |

DAVID SCHONBERG, *Primary Examiner.*

LOUIS R. PRINCE, *Examiner.*